(12) United States Patent
Sargent

(10) Patent No.: US 6,737,494 B2
(45) Date of Patent: May 18, 2004

(54) SYNTHESIS AND USE OF ALKYLALKOXYACYLOXYSILANES AND BLENDS THEREOF FOR USE AS A CROSSLINKING AGENT IN MOISTURE CURING RTV'S

(75) Inventor: Jonathan R. Sargent, Saugus, MA (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 10/035,450

(22) Filed: Nov. 9, 2001

(65) Prior Publication Data

US 2003/0092861 A1 May 15, 2003

(51) Int. Cl.$^7$ ............................................. C08G 77/08
(52) U.S. Cl. ........................... 528/17; 528/901; 528/34; 525/474; 556/442
(58) Field of Search ........................... 528/901, 34, 17; 525/474; 556/442

(56) References Cited

U.S. PATENT DOCUMENTS

| 3,701,755 | A |   | 10/1972 | Misao Sumoto et al. |
| 4,220,748 | A | * | 9/1980  | Hashimoto et al. |
| 4,323,489 | A |   | 4/1982  | Beers |
| 4,483,973 | A |   | 11/1984 | Lucas et al. |
| 4,539,367 | A |   | 9/1985  | Beers |
| 4,720,531 | A |   | 1/1988  | Chung et al. |
| 4,839,453 | A |   | 6/1989  | Chung et al. |
| 5,091,445 | A |   | 2/1992  | Revis |
| 5,162,407 | A |   | 11/1992 | Turner |
| 5,166,243 | A |   | 11/1992 | Neale |
| 5,948,853 | A |   | 9/1999  | Bayly et al. |

* cited by examiner

Primary Examiner—Kuo-Liang Peng
(74) Attorney, Agent, or Firm—Kenneth S. Wheelock

(57) ABSTRACT

A one part moisture curable room temperature vulcanizable silicone composition comprising an alkylalkoxyacyloxysilane selected from the group consisting of $$R^1SiR^2{}_aR^3{}_{3-a}$$

and $$R^4R^5{}_bR^6{}_{3-b}Si{-}O{-}SiR^7R^8{}_cR^9{}_{3-c}$$

and mixtures thereof; where $R^1$, $R^4$ and $R^7$ are independently selected from alkyl radicals having, the formula $(CH_2)_nX$, where n has 1 to 10, and X is selected from the group consisting of hydrogen, amino, epoxy, cyano, thiocyano, allyl, and vinyl; $R^2$ $R^5$ and $R^8$ are independently selected from acyloxy radicals having the formula $OC(O)(CH_2)_mH$, where m has 1 to 8; $R^3$, $R^6$ and $R^9$ are independently selected from alkoxy radicals or mixture of alkoxy radicals of 1 to 10 carbon atoms wherein the subscripts a, b and c are subject to the following limitations: $0<a<3$; $0<b<3$; and $0<c<3$ wherein said alkylalkoxyacyloxysilane is a liquid at a temperature above 0° C.

17 Claims, No Drawings

SYNTHESIS AND USE OF ALKYLALKOXYACYLOXYSILANES AND BLENDS THEREOF FOR USE AS A CROSSLINKING AGENT IN MOISTURE CURING RTV'S

FIELD OF THE INVENTION

This invention relates to novel polyorganosiloxane cross-linkers or chain extenders for room temperature vulcanizable (RTV) sealants, and to novel RTV sealant compositions containing same. The invention further relates to novel methods of production of the claimed cross-linkers or chain extenders.

BACKGROUND

Several types of RTV sealants are have been previously described as discussed below:

Siloxanol-silicate Type

In the earliest RTV silicone system the major polymer component was a linear or moderately branched silicone with silanol terminal groups. Alkyl silicates or alkylpolysilicates, typically tetraethyl orthosilicate or partially hydrolyzed and condensed products therefrom, were used as crosslinking agents. Catalysts typically employed were tin compounds, e.g., stannous octoate, dibutyltindilaurate. Fillers. color pigments and other ancillary materials were also used. The system was usually prepared in two parts, thereby maintaining separation of the siloxanol polymer and the catalyst. At point of use, the two parts were mixed, thereby initiating crosslinking of the siloxanol. The fluid, or plastic working life, of the material is limited thereafter. Accurately measured proportions and thorough mixing were necessary to produce uniformly cured articles. The need for mixing limits useful compositions to those that were easily stirred and poured, thereby limiting both polymer viscosity and the level of filler loading. In the early development of this system the role of water was not appreciated. Later, it was established that at least catalytic amounts of water were essential and that unless special steps were taken for its rigorous exclusion prior to use, water absorbed on the filler or otherwise present could prematurely catalyze the crosslinking reactions.

Moisture Reactive Types

The next major development in RTV silicones was the one-part system in which a mixture of all components (except water) remained workable in a sealed container until exposed to moisture, such as that present in the atmosphere. The major polymer component was a linear or lightly branched silicone having reactive groups that readily underwent hydrolytic polymerization to form siloxanes. The reactive groups, that readily underwent hydrolytic polymerization could be present in terminal or non-terminal positions or both. A large number of reactive groups were reported in the prior art to be effective. The crosslinking agents usually possessed three or more identical reactive groups are present per molecule. A wide variety of catalysts are used; the choice depending on the nature of the functional group that readily underwent hydrolytic polymerization. Metal and amino carboxylate salts are often useful. While cross-linkers of this type are highly effective, they do possess limitations. For instance, polyfunctional silane monomers represent highly concentrated sites of functionality. They are therefore usually not well suited as means for modifying the properties of the cured sealant. The presence of identical functional groups upon the cross-linker also poses problems concerning workability of the sealant composition since gellation times and curing times vary little. This may be remedied by employing sealants containing mixtures of cross-linkers. However, problems associated with proper distribution of the cross-linkers within the sealant composition then occur.

The utility of the moisture reactive type of RTV silicon is limited by the nature of the by-products HX (X being the functional group that readily underwent hydrolytic polymerization) which can be objectionably acidic. toxic, corrosive, malodorous or, in some other way, undesirable. This limitation has stimulated the search for RTV silicon systems which form only innocuous by-products or even none at all.

Vinyl-hydridosiloxane Type

In this more recent development, crosslinking is accomplished by hydrosilylation. The major polymer components is usually a linear or lightly branched silicone with vinyl or other olefinic groups in terminal or non-terminal positions. The crosslinker is usually a low molecular weight siloxane with three or more hydridosiloxane units per molecule. Catalysts are typically platinum compounds that are effective at parts per million (ppm) levels. Compositions of this type that are active at room temperature are two-part systems. One-part systems are made with inhibited catalysts but require elevated temperatures for at least brief periods to activate the catalyst and are therefore not true RTV systems. A drawback of this kind of crosslinking system is that the platinum catalyst can be poisoned by many substances. This type of curing mechanism has a significant advantage in that no undesirable reaction products are formed.

Oxygen Curable Mercaptoalkyl Type

In this most recently developed type of RTV silicone, crosslinking occurs by oxidation of mercaptoalkyl substituents upon contact with molecular oxygen. The major polymer components is a linear or lightly branched silicone having mercaptoalkyl substituents, such as a 3-mercaptopropyl bonded directly to the silicon. Crosslinker components are optional and are usually low molecular weight silicones having three or more mercaptoalkyl substituents per molecule. Catalysts are organic compounds of pro-oxidant metals such as cobalt.

With respect to limitations imposed by by-products, in this system the major by-product is water which is considered to be relatively innocuous and which can usually be tolerated or, if necessary, removed in many applications. However, under some conditions, side reactions may result in the formation of small amounts of malodorous and toxic hydrogen sulfide. Furthermore, in contact with sensitive surfaces, such as silver or copper, unreacted mercaptoalkyl groups may have undesirable interactions. Also, compositions containing disulfide linkages can degenerate with formation of corrosive sulfur compounds such as sulfurous and sulfuric acids on exposure to moisture and air at elevated temperatures.

RTV sealant compositions often also contain non-reactive silicone oils as viscosity modifiers. However, while these oils do indeed aid in the formulation of the sealant, their presence in the crude product is often undesirable since their non-reactive nature allows them to bleed out of the cured material.

Acetoxysilanes are well known cross-linking agents for one-part room temperature vulcanizable silicone rubber compositions. A common type of such an acetoxysilane cross-linking agent is methyltriacetoxysilane. Methyltriacetoxysilane is known to have a melting point of 40° C., and has a disadvantage in that it must be melted or blended with another silane in order to be able to add it to a continuous extruder.

Blends of methyltriacetoxysilane and ethyltriacetoxysilane have been used as cross-linking agent in acetoxy cure RTVs.

In view of the inadequacies associated with the various RTV compositions discussed above, there is a need for RTV compositions that are not associated with undesirable by-products and which possess more varied physical properties than compositions of the prior art afford. While this latter quality may be partly attainable through the use of a mixture of different cross-linkers within a give sealant composition, this leads to variations in their concentration throughout the composition.

SUMMARY OF THE INVENTION

The present invention provides for a one part moisture curable room temperature vulcanizable silicone composition comprising an alkylalkoxyacyloxysilane selected from the group consisting of $$R^1SiR^2_aR^3_{3-a}$$

and $$R^4R^5_bR^6_{3-b}Si-O-SiR^7R^8_cR^9_{3-c}$$

and mixtures thereof; where $R^1$, $R^4$ and $R^7$ are independently selected from the group of alkyl radicals having the formula $(CH_2)_nX$, where n has 1 to 10 carbon atoms, and X is selected from the group consisting of hydrogen, amino, epoxy, cyano, thiocyano, allyl, and vinyl; $R^2$ $R^5$ and $R^8$ are independently selected from the group of acyloxy radicals having the formula $OC(O)(CH_2)_mH$, where m has 1 to 8 carbon atoms; $R^3$, $R^6$ and $R^9$ are independently selected from the group of alkoxy radicals or mixture of alkoxy radicals of 1 to 10 carbon atoms wherein the subscripts a, b and c are subject to the following limitations: $0<a<3$; $0<b<3$; and $0<c<3$ wherein said alkylalkoxyacyloxysilane is a liquid at a temperature above 0° C.

The present invention further provides for a moisture curable room temperature vulcanizable silicone composition thacomprises:

(A) from about 1 to about 99 weight percent of a silanol stopped (terminated) polydimethylsiloxane having a viscosity ranging from about 1,000 to about 500,000 centipoise (cps) at 25° C.;

(B) from about 1 to about 99 weight percent of a silanol stopped polydimethylsiloxane having a viscosity ranging from about 5 to about 3,000 centipoise (cps) at 25° C.;

(C) from about 0.1 to about 30 weight percent of an alkylalkoxyacyloxysilane cross-linker compound selected from the group consisting of $$R^1SiR^2_aR^3_{3-a}$$

and $$R^4R^5_bR_{63-b}Si-O-SiR^7R^8_cR^9_{3-c}$$

and mixtures thereof; where $R^1$, $R^4$ and $R^7$ are independently selected from the group of alkyl radicals having the formula $(CH_2)_nX$, where n has 1 to 10 carbon atoms, and X is selected from the group consisting of hydrogen, amino, epoxy, cyano, thiocyano, allyl, and vinyl; $R^2$ $R^5$ and $R^8$ are independently selected from the group of alkoxy radicals having the formula $OC(O)(CH_2)_mH$, where m has 1 to 8 carbon atoms; $R^3$, $R^6$ and $R^9$ are independently selected from the group of alkoxy radicals or mixture of alkoxy radicals of 1 to 10 carbon atoms wherein the subscripts a, b and c are subject to the following limitations: $0<a<3$; $0<b<3$; and $0<c<3$ wherein said alkylalkoxyacyloxysilane is a liquid at a temperature above 0° C.;

(D) from about 0.01 to about 10 weight percent of a tin condensation cure catalyst selected from the group consisting of dibutyltindilaurate, dibutyltindiacetate, dibutyldibutoxytin, dibutyldimethoxytin, and dibutyldineodecanoatetin.

DETAILED DESCRIPTION OF THE INVENTION

The present invention provides for silicone RTV compositions, containing a crosslinking agent that is reactive in the presence of moisture and a $Sn^{4+}$ catalyst. The present invention further provides for a crosslinking agent that is a liquid at temperatures above zero degrees Celsius. The present invention further provides for a synthesis of the catalyst that does not produce hazardous waste, such as acetyl chloride in its syntheses. The present invention further provides for silicone RTV sealants made using this crosslinking agent having excellent primerless adhesion, without the addition of an adhesion promoter.

The present invention relates to a 1-component, room temperature vulcanized silicone sealant compositions that are fast curing, have excellent primerless adhesion, and are shelf-stable. More particularly, the present invention relates to the discovery of the use of a new family of alkylalkoxyacyloxysilane based crosslinking agents which together with polyhydroxy terminated polydimethlysiloxane (PDMS) polymers, reinforcing fillers, plasticizing oils, and $Sn^{+4}$ condensation cure catalysts, provide fast curing, self bonding, shelf stable, low temperature stable, 1-part, RTV silicone sealants. Further, these new alkylalkoxyacyloxysilane based crosslinking agents are liquid at ambient temperature, i.e. above 0° C., preferably above 10° C., more preferably above 20° C. and most preferably above 25° C. The alkylalkoxyacyloxysilane based crosslinking agents of the present invention are selected from the group consisting of $$R^1SiR^2_aR^3_{3-a} \qquad \text{(formula I)}$$

and $$R^4R^5_bR^6_{3-b}Si-O-SiR^7R^8_cR^9_{3-c} \qquad \text{(formula II)}$$

and mixtures thereof;

wherein in the above formulas, $R^1$, $R^4$ and $R^7$ are independently selected from the group of alkyl radicals having the formula $(CH_2)_nX$, where n has 1 to 10 carbon atoms, and X is selected from the group consisting of hydrogen, amino, epoxy, cyano, thiocyano, allyl, and vinyl and is most preferably hydrogen; $R^2$ $R^5$ and $R^8$ are independently selected from the group of acyloxy radicals having the formula $OC(O)(CH_2)_mH$, where m has 1 to 8 carbon atoms and is most preferably 1. $R_3$, $R^6$, and $R^9$ are independently selected from the group of alkoxy radicals or mixture of alkoxy radicals of 1 to 10 carbon atoms, and is most preferably 2-propyl, 2-butyl, or 1 butyl. For molecular species a, b and c are independently either 1 or 2 but for mixtures of these crosslinker compounds, which may be mixtures of formula I compounds, formula II compounds or mixtures of formula I and formula II compounds, $0<a<3$; $0<b<3$; and $0<c<3$; with a preferably varying from about 1.50 to about 2.95, more preferably from about 2.20 to about 2.90, and most preferably varying from about 2.75 to about 2.85; with b preferably varying from about 0.50 to about 1.95, more preferably varying from about 1.60 to about 1.95, and most preferably from about 1.75 to about 1.85; and with c preferably varying from about 0.50 to about 1.95, more preferably varying from about 1.60 to about 1.90, and most preferably from about 1.75 to about 1.85. The ranges of carbon atom atoms in the above groups for $R^z$ where z runs from 1 through 9 are inclusive ranges that also include all intermediate ranges subtended by the most extensive range for each specific $R^z$.

The present invention also provides for a moisture curable RTV sealant composition comprising:

(A) from about 1 to about 99 weight percent, preferably from about 5 to about 90 weight percent, more preferably from about 20 to about 85 weight percent and most preferably from about 40 to about 80 weight percent of a silanol stopped (terminated) polydimethylsiloxane having a viscosity ranging from about 1,000 to about 500,000 centipoise (cps) at 25° C.;

(B) from about 1 to about 99 weight percent, preferably from about 5 to about 90 weight percent, more preferably from about 7 to about 85 weight percent and most preferably from about 9 to about 80 weight percent of a silanol stopped polydimethylsiloxane having a viscosity ranging from about 5 to about 3,000 centipoise (cps) at 25° C.;

(C) from about 0.1 to about 30 weight percent, preferably from about 0.2 to about 20 weight percent, more preferably from about 0.5 to about 15 weight percent and most preferably from about 1 to about 10 weight percent of a cross-linker compound of the present invention;

(D) from about 0.01 to about 10 weight percent, preferably from about 0.01 to about 7.5 weight percent, more preferably from about 0.01 to about 5 weight percent and most preferably from about 0.01 to about 3 weight percent by weight of a tin condensation cure catalyst selected from the group consisting of dibutyltindilaurate, dibutyltindiacetate, dibutyldibutoxytin, dibutyldimethoxytin, and dibutyldineodecanoatetin.

The RTV sealant may optionally contain from about 0.1 to about 40 weight percent, preferably from about 0.5 to about 30 weight percent, more preferably from about 1 to about 20 weight percent and most preferably from about 5 to about 15 weight percent, of a reinforcing filler selected from the group consisting of fumed silica, precipitated silica, and calcium carbonate.

The RTV sealant may optionally contain from about 0 to about 40 weight percent, preferably from about 0.5 to about 30 weight percent, more preferably from about 1 to about 20 weight percent and most preferably from about 5 to about 15 weight percent, of a plasticizing fluid being a polydiorganosiloxane (e.g. polydimethylsiloxane) having a viscosity ranging from about 1 to about 3,000 centipoise at 25° C., preferably from about 1 to about 1,000 centipoise at 25° C., more preferably from about 1 to about 500 centipoise at 25° C. and most preferably from about 1 to about 350 centipoise at 25° C.

More particularly the present invention provides for an RTV composition comprising:

(A) 69 parts by weight of a silanol stopped polydimethylsiloxane having a viscosity of 22,000 centipoise (cps) at 25.degree. C.;

(B) 9 parts by weight of a silanol stopped polydimethylsiloxane having a viscosity of 2000 centipoise (cps) at 25.degree. C.;

(C) 10 parts by weight of a dimethyldichlorosilane treated fumed silica filler;

(D) 4 parts by weight of a mixture of triacetoxysilane and (2-propoxy)methyldiacetoxysilanes synthesized in example 3.

(E) 0.0257 parts by weight of dibutyl tin dilaurate tin condensation cure catalyst;

(F) 8 parts by weight of a linear trimethyl stopped branched polydimethylsiloxane plasticizing fluid.

Experimental

EXAMPLE 1

Example 1 describes the preparation of (1-butoxy)methyldiacetoxysilane. This crosslinker was synthesized by mixing the following ingredients under anhydrous conditions.

297.2 g of 1-butanol 882.6 g of triacetoxysilane

The reaction mixture was stirred for 15 minutes followed by evaporation of acetic acid under reduced pressure.

EXAMPLE 2

Example 2 describes the preparation of a mixture of (1-butoxy)methyldiacetoxysilane and methyltriacetoxysilane. This crosslinker was synthesized by mixing the following ingredients under anhydrous conditions. This catalyst mixture is a liquid at 20° C.

103.4 g of 1-butanol 882.6 g of methyltriacetoxysilane

The reaction mixture was stirred for 15 minutes followed by evaporation of acetic acid under reduced pressure.

EXAMPLE 3

Example 3 describes the preparation of a mixture of methyltriacetoxysilane and butoxymethyldiacetoxysilane. This crosslinker was synthesized by mixing the following ingredients under anhydrous conditions. This catalyst mixture is a liquid a 20° C.

21.0 g of n-butanol 220.1 g of triacetoxysilane

The reaction mixture was stirred for 15 minutes followed by evaporation of acetic acid under reduced pressure. The product $^1$H-NMR and $^{29}$Si NMR were consistent with that of a mixture of methyltriacetoxysilane, (2-propoxy)methyldiacetoxysilane, and di(2-propoxy)methylacetoxysilane.

EXAMPLE 4

Example 4 describes the preparation of a mixture of methyltriacetoxysilane, (2-propoxy)methylacetoxysilanes. This crosslinker was synthesized by mixing the following ingredients under anhydrous conditions.

15.3 g of 2-propanol 220.1 g of triacetoxysilane

The reaction mixture was stirred for 15 minutes, followed b evaporation of acetic acid under reduced pressure.

EXAMPLE 5

Example 4 describes the preparation of a mixture of methyltriacetoxysilane, (2-propoxy)methylacetoxysilanes and acetic acid. This crosslinker was synthesized by mixing the following ingredients under anhydrous conditions.

11.5 g of 2-propanol 220.1 g of triacetoxysilane

The reaction mixture was stirred for 15 minutes, no removal of acetic acid.

EXAMPLE 6

RTV sealant made with a crosslinking agent composed of a mixture of triacetoxysilane and (2-methyl 2-propoxy) methylacetoxysilanes. This sealant was mixed and extruded in a Werner-Pfleiderer extruder as described elsewhere.

Preparation of a one component silicone sealant having the following composition:

(A) 69 parts by weight of a silanol stopped polydimethylsiloxane having a viscosity of 22,000 centipoise (cps) at 25° C., (B) 9 parts by weight of a silanol stopped polydimethylsiloxane having a viscosity of 2000 centipoise (cps) at 25.degree. C.;

(C) 10 parts by weight of a dimetlhyldichlorosilane treated fumed silica filler;

(D) 4 part by weight of a mixture of triacetoxysilane and (2-propoxy)methyldiacetoxysilanes synthesized in example 3.

(E) 0.0257 parts by weight of dibutyl tin dilaurate tin condensation cure catalyst;

(F) 8 parts by weight of a linear trimethyl stopped branched polydimethylsiloxane plasticizing fluid.

The physical properties of this sealant can be seen in table 1.

EXAMPLE 7

RTV sealant made with a crosslinking agent composed of a mixture of mixture of (1-butoxy)methyldiacetoxysilane and methyltriacetoxysilane. This sealant was mixed and extruded in a Werner-Pfliederer twin-screw extruder.

Preparation of a one component silicone sealant having the following composition:

(A) 69 parts by weight of a silanol stopped polydimethylsiloxane having a viscosity of 22,000 centipoise (cps) at 25° C.;

(B) 9 parts by weight of a silanol stopped polydimethylsiloxane having a viscosity of 2000 centipoise (cps) at 25° C.;

(C) 10 parts by weight of a dimethyldichlorosilane treated fumed silica filler;

(D) 4.0 parts by weight of the mixture of mixture of (1-butoxy)methyldiacetoxysilane and methyltriacetoxysilane described in example 2;

(E) 0.0257 parts by weight of dibutyl tin dilaurate tin condensation cure catalyst;

(F) 8 parts by weight of a linear trimethyl stopped branched polydimethylsiloxane plasticizing fluid.

The physical properties of this sealant can be seen in table 1.

EXAMPLE 8

RTV sealant made with a crosslinking agent composed of a mixture of methyltriacetoxysilane and (2-propoxy) methyldiacetoxysilane. This sealant was mixed and extruded in a WP extruder as described elsewhere.

Preparation of a one component silicone sealant having the following composition:

(A) 69 parts by weight of a silanol stopped polydimethylsiloxane having a viscosity of 22,000 centipoise (cps) at 25° C.;

(B) 9 parts by weight of a silanol stopped polydimethylsiloxane having a viscosity of 2000 centipoise (cps) at 25° C.;

(C) 10 parts by weight of a dimethyldichlorosilane treated fumed silica filler;

(D) 4.0 parts by weight of the mixture of mixture of (2-propoxy)methyldiacetoxysilane and methyltriacetoxysilane described in example 3;

(E) 0.0257 parts by weight of dibutyl tin dilaurate tin condensation cure catalyst;

(F) 8 parts by weight of a linear trimethyl stopped branched polydimethylsiloxane plasticizing fluid.

The physical properties of this sealant can be seen in table 1.

EXAMPLE 9

RTV sealant made with a crosslinking agent composed of a mixture of methyltriacetoxysilane, (2-propoxy) methyldiacetoxysilane, and acetic acid. This sealant was mixed and extruded in a WP extruder as described elsewhere.

Preparation of a one component silicone sealant having the following composition:

(A) 69 parts by weight of a silanol stopped polydimethylsiloxane having a viscosity of 22,000 centipoise (cps) at 25° C.;

(B) 9 parts by weight of a silanol stopped polydimethylsiloxane having a viscosity of 2000 centipoise (cps) at 25° C.

(C) 10 parts by weight of a dimethyldichlorosilane treated fumed silica filler;

(D) 4.0 parts by weight of the mixture of mixture of (2-propoxy)methyldiacetoxysilane and methyltriacetoxysilane described in example 3;

(E) 0.0257 parts by weight of dibutyl tin dilaurate tin condensation cure catalyst;

(F) 8 parts by weight of a linear trimethyl stopped branched polydimethylsiloxane plasticizing fluid.

The physical properties of this sealant can be seen in table 1.

The advantage of this invention is that it is a simple way to product a low melting catalyst (will melt at room temperature), by a one step reaction, with or without stripping the acetic acid.

TABLE 1

Physical properties of sealant described in example 6, 7, 8, 9.

| EXPERIMENT # | 6 | 7 | 8 | 9 |
|---|---|---|---|---|
| UNCURED PROPERTIES | | | | |
| Tack Free Time (Min) | 14 min | 16 min | 16 min | 25 min |
| Application Rate (G/MIN) | 276 | 342 | 378 | 356 |
| Boeing Flow (inches) | 0.05 | 0.05 | 0.05 | 0.1 |
| Specific Gravity (g/ml) | 1.04 | 1.04 | 1.02 | 1.03 |
| APPEARANCE | clear translucent | Clear translucent | clear translucent | clear translucent |

TABLE 1-continued

Physical properties of sealant described in example 6, 7, 8, 9.

| EXPERIMENT # | 6 | 7 | 8 | 9 |
|---|---|---|---|---|
| PHYS. PROP. | | | | |
| Shore A | 25 | 20 | 22 | 21 |
| Tensile (PSI) | 337 | 341 | 271 | 308 |
| Elongation % | 407 | 511 | 401 | 465 |
| C-628 PEEL ADHESION | | | | |
| GLASS (PPI/COH %) | 153/100% | 129/100% | 146/100% | 187/75% |

Having described the invention that which is claimed is:

1. A one part moisture curable room temperature vulcanizable silicone composition comprising an alkylalkoxyacyloxysilane selected from the group consisting of $R^1Si\,R^2_aR^3_{3-a}$, $R^4\,R^5_bR^6_{3-b}Si-O-Si\,R^7\,R^8_cR^9_{3-c}$ and mixtures thereof; where $R^1$; $R^4$ and $R^7$ are independently selected from the group of alkyl radicals having the formula $(CH_2)_nX$, where n is 1 to 10, and X is selected from the group consisting of hydrogen, amino, epoxy, cyano, thiocyano, allyl, and vinyl; $R^2\,R^5$ and $R^8$ are independently selected from the group of acyloxy radicals having the formula $OC(O)(CH_2)_mH$, where m is 1 to 8; $R^3$, $R^6$ and $R^9$ are independently selected from the group of alkoxy radicals or mixture of alkoxy radicals having 1 to 10 carbon atoms wherein the subscripts a, b and c are subject to the following limitations: $0<a<3$; $0<b<3$; and $0<c<3$ wherein said alkylalkoxyacyloxysilane is a liquid at a temperature above 0° C. wherein the moisture curable room temperature vulcanizable silicone composition comprises:

(A) from about 1 to about 99 weight percent of a silanol stopped polydimethylsiloxane having a viscosity ranging from about 1,000 to about 500,000 centipoise (cps) at 25° C.;

(B) from about 1 to about 99 weight percent of a silanol stopped polydimethylsiloxane having a viscosity ranging from about 5 to about 3,000 centipoise (cps) at 25° C.;

(C) from about 0.1 to about 30 weight percent of an alkylalkoxyacyloxysilane cross-linker compound selected from the group consisting of $R^1\,Si\,R^2_aR^3_{3-a}$, $R^4\,R^5_bR^6_{3-b}Si-O-Si\,R^7\,R^8_cR^9_{3-c}$ and mixtures thereof; where $R^1$, $R^4$ and $R^7$ are independently selected from the group of alkyl radicals having the formula $(CH_2)_nX$, where n is 1 to 10, and X is selected from the group consisting of hydrogen, amino, epoxy, cyano, thiocyano, allyl, and vinyl; $R^2\,R^5$ and $R^8$ are independently selected from the group of acyloxy radicals having the formula $OC(O)(CH_2)_mH$, where m is 1 to 8; $R^3$, $R^6$ and $R^9$ are independently selected from the group of alkoxy radicals or mixture of alkoxy radicals of 1 to 10 carbon atoms wherein the subscripts a, b and c are subject to the following limitations: $0<a<3$; $0<b<3$; and $0<c<3$ wherein said alkylalkoxyacyloxysilane is a liquid at a temperature above 0° C.;

(D) from about 0.01 to about 10 weight percent of a tin condensation cure catalyst selected from the group consisting of dibutyltindilaurate, dibutyltindiacetate, dibutyldibutoxytin, dibutyldimethoxytin, and dibutyldineodecanoatetin.

2. The composition of claim 1 wherein the moisture curable room temperature vulcanizable silicone composition comprises:

(A) from about 5 to about 90 weight percent of a silanol stopped polydimethylsiloxane having a viscosity ranging from about 1,000 to about 500,000 centipoise (cps) at 25° C.;

(B) from about 5 to about 90 weight percent of a silanol stopped polydimethylsiloxane having a viscosity ranging from about 5 to about 3,000 centipoise (cps) at 25° C.;

(C) from about 0.2 to about 20 weight percent of an alkylalkoxyacyloxysilane cross-linker compound selected from the group consisting of $R^1Si\,R^2_aR^3_{3-a}$ $R^4R^5_bR^6_{3-b}Si-O-Si\,R^7R^8_cR^9_{3-c}$ and mixtures thereof; where $R^1$, $R^4$ and $R^7$ are independently selected from the group of alkyl radicals having the formula $(CH_2)_nX$, where n is 1 to 10, and X is selected from the group consisting of hydrogen, amino, epoxy, cyano, thiocyano, allyl, and vinyl; $R^2\,R^5$ and $R^8$ are independently selected from the group of acyloxy radicals having the formula $OC(O)(CH_2)_mH$, where m is 1 to 8; $R^3$, $R^6$ and $R^9$ are independently selected from the group of alkoxy radicals or mixture of alkoxy radicals of 1 to 10 carbon atoms wherein the subscripts a, b and c are subject to the following limitations: $0<a<3$; $0<b<3$; and $0<c<3$ wherein said alkylalkoxyacyloxysilane is a liquid at a temperature above 0° C.;

(D) from about 0.01 to about 7.5 weight percent of a tin condensation cure catalyst selected from the group consisting of dibutyltindilaurate, dibutyltindiacetate, dibutyldibutoxytin, dibutyldimethoxytin, and dibutyldineodecanoatetin.

3. The composition of claim 2 wherein the moisture curable room temperature vulcanizable silicone composition comprises:

(A) from about 20 to about 85 weight percent of a silanol stopped polydimethylsiloxane having a viscosity ranging from about 1,000 to about 500,000 centipoise (cps) at 25° C.;

(B) from about 7 to about 85 weight percent of a silanol stopped polydimethylsiloxane having a viscosity ranging from about 5 to about 3,000 centipoise (cps) at 25° C.;

(C) from about 0.5 to about 15 weight percent of an alkylalkoxyacyloxysilane cross-linker compound selected from the group consisting of $R^1Si\,R^2_a\,R^3_{3-a}$, $R^4R^5_bR^6_{3-b}Si-O-Si\,R^7R^8_cR^9_{3-c}$ and mixtures thereof; where $R^1$, $R^4$ and $R^7$ are independently selected from the group of alkyl radicals having the formula $(CH_2)_nX$, where n is 1 to 10, and X is selected from the group consisting of hydrogen, amino, epoxy, cyano, thiocyano, allyl, and vinyl; $R^2\,R^5$ and $R^8$ are independently selected from the group of acyloxy radicals having the formula $OC(O)(CH_2)_mH$, where m is 1 to 8; $R^3$, $R^6$ and $R^9$ are independently selected from the group of alkoxy radicals or mixture of alkoxy radicals of 1 to 10 carbon atoms wherein the subscripts a, b and c are subject to the following limitations: $0<a<3$; $0<b<3$; and $0<c<3$ wherein said alkylalkoxyacyloxysilane is a liquid at a temperature above 0° C.;

(D) from about 0.01 to about 5.0 weight percent of a tin condensation cure catalyst selected from the group consisting of dibutyltindilaurate, dibutyltindiacetate, dibutyldibutoxytin, dibutyldimethoxytin, and dibutyldineodecanoatetin.

4. The composition of claim 3 wherein the moisture curable room temperature vulcanizable silicone composition comprises:

(A) from about 40 to about 80 weight percent of a silanol stopped polydimethylsiloxane having a viscosity ranging from about 1,000 to about 500,000 centipoise (cps) at 25° C.;

(B) from about 9 to about 80 weight percent of a silanol stopped polydimethylsiloxane having a viscosity ranging from about 5 to about 3,000 centipoise (cps) at 25° C.;

(C) from about 1 to about 10 weight percent of an alkylalkoxyacyloxysilane cross-linker compound selected from the group consisting of

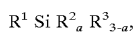
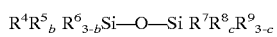

and mixtures thereof; where $R^1$, $R^4$ and $R^7$ are independently selected from the group of alkyl radicals having the formula $(CH_2)_nX$, where n is 1 to 10, and X is selected from the group consisting of hydrogen, amino, epoxy, cyano, thiocyano, allyl, and vinyl; $R^2$ $R^5$ and $R^8$ are independently selected from the group of acyloxy radicals having the formula $OC(O)(CH_2)_mH$, where m is 1 to 8; $R^3$, $R^6$ and $R^9$ are independently selected from the group of alkoxy radicals or mixture of alkoxy radicals of 1 to 10 carbon atoms wherein the subscripts a, b and c are subject to the following limitations: $0<a<3$; $0<b<3$; and $0<c<3$ wherein said alkylalkoxyacyloxysilane is a liquid at a temperature above 0° C.;

(D) from about 0.01 to about 3.0 weight percent of a tin condensation cure catalyst selected from the group consisting of dibutyltindilaurate, dibutyltindiacetate, dibutyldibutoxytin, dibutyldimethoxytin, and dibutyldineodecanoatetin.

5. The composition of claim 1 wherein the alkylalkoxyacyloxysilane cross-linker is selected from the group consisting of 2-propoxymethyldiacetoxysilane and 1-butoxymethyldiacetoxysilane.

6. The composition of claim 5 wherein the alkylalkoxyacyloxysilane cross-linker is 2-propoxymethyldiacetoxysilane.

7. The composition of claim 5 wherein the alkylalkoxyacyloxysilane cross-linker is 1- butoxymethyldiacetoxysilane.

8. The composition of claim 2 wherein the alkylalkoxyacyloxysilane cross-linker is selected from the group consisting of 2-propoxymethyldiacetoxysilane and 1-butoxymethyldiacetoxysilane.

9. The composition of claim 8 wherein the alkylalkoxyacyloxysilane cross-linker is 2-propoxymethyldiacetoxysilane.

10. The composition of claim 8 wherein the alkylalkoxyacyloxysilane cross-Linker is 1- butoxymethyldiacetoxysilane.

11. The composition of claim 3 wherein the alkylalkoxyacyloxysilane cross-linker is selected from the group consisting of 2-propoxymethyldiacetoxysilane and 1-butoxymethyldiacetoxysilane.

12. The composition of claim 11 wherein the alkylalkoxyacyloxysilane cross-linker is 2-propoxymethyldiacetoxysilane.

13. The composition of claim 11 wherein the alkylalkoxyacyloxysilane cross-linker is 1- butoxymethyldiacetoxysilane.

14. The composition of claim 4 wherein the alkylalkoxyacyloxysilane cross-linker is selected from the group consisting of 2-propoxymethyldiacetoxysilane and 1-butoxymethyldiacetoxysilane.

15. The composition of claim 14 wherein the alkylalkoxyacyloxysilane cross-linker is 2-propoxymethyldiacetoxysilane.

16. The composition of claim 14 wherein the alkylalkoxyacyloxysilane cross-linker is 1-butoxymethyldiacetoxysilane.

17. A one part moisture curable room temperature vulcanizable silicone composition comprising an alkylalkoxyacyloxysilane selected from the group consisting of $R^1 Si R^2_a R^3_{3-a}$, $R^4$ $R^5_b R^6_{3-b} Si-O-Si$ $R^7$ $R^8_c R^9_{3-c}$ and mixtures thereof; where $R^1$, $R^4$ and $R^7$ are independently selected from the group of alkyl radicals having the formula $(CH_2)_nX$, where n is 1 to 10, and X is selected from the group consisting of hydrogen, amino, epoxy, cyano, thiocyano, allyl, and vinyl; $R^2$ $R^5$ and $R^8$ are independently selected from the group of acyloxy radicals having the formula $OC(O)(CH_2)_mH$, where m is 1 to 8; $R^3$, $R^6$ and $R^9$ are independently selected from the group of alkoxy radicals or mixture of alkoxy radicals having 1 to 10 carbon atoms wherein the subscripts a, b and c are subject to the following limitations: $0<a<3$; $0<b<3$; and $0<c<3$ wherein said alkylalkoxyacyloxysilane is a liquid at a temperature above 0° C. wherein said moisture curable room temperature vulcanizable silicone composition consists essentially of:

(A) from about 1 to about 99 weight percent of a silanol stopped polydimethylsiloxane having a viscosity ranging from about 1,000 to about 500,000 centipoise (cps) at 25° C.;

(B) from about 1 to about 99 weight percent of a silanol stopped polydimethylsiloxane having a viscosity ranging from about 5 to about 3,000 centipoise (cps) at 25° C.;

(C) from about 0.1 to about 30 weight percent of an alkylalkoxyacyloxysilane cross-linker compound selected from the group consisting of

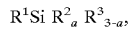
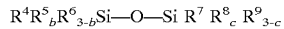

and mixtures thereof; where $R^1$, $R^4$ and $R^7$ are independently selected from the group of alkyl radicals having the formula $(CH_4)_nX$, where n is 1 to 10, and X is selected from the group consisting of hydrogen, amino, epoxy, cyano, thiocyano, allyl, and vinyl; $R^2$ $R^5$ and $R^8$ are independently selected from the group of acyloxy radicals having the formula $OC(O)(CH_2)_mH$, where m is 1 to 8; $R^3$, $R^6$ and $R^9$ are independently selected from the group of alkoxy radicals or mixture of alkoxy radicals of 1 to 10 carbon atoms wherein the subscripts a, b and c are subject to the following limitations: $0<a<3$; $0<b<3$; and $0<c<3$ wherein said alkylalkoxyacyloxysilane is a liquid at a temperature above 0° C.;

(D) from about 0.01 to about 10 weight percent of a tin condensation cure catalyst selected from the group consisting of dibutyltindilaurate, dibutyltindiacetate, dibutyldibutoxytin, dibutyldimethoxytin, and dibutyldineodecanoatetin.

* * * * *